(12) United States Patent
Jozsa et al.

(10) Patent No.: US 10,704,436 B2
(45) Date of Patent: Jul. 7, 2020

(54) INTERNAL COMBUSTION ENGINE SYSTEM AND METHOD FOR INCREASING THE TEMPERATURE IN AT LEAST ONE PART OF THE INTERNAL COMBUSTION ENGINE SYSTEM

(71) Applicant: VOLVO TECHNOLOGY CORPORATION, Göteborg (SE)

(72) Inventors: Peter Mårdberg Jozsa, Göteborg (SE); Arne Andersson, Mölnlycke (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/728,541

(22) Filed: Oct. 10, 2017

(65) Prior Publication Data

US 2018/0058285 A1  Mar. 1, 2018

Related U.S. Application Data

(62) Division of application No. 14/349,338, filed as application No. PCT/SE2011/000172 on Oct. 3, 2011, now Pat. No. 9,835,065.

(51) Int. Cl.
| | |
|---|---|
| *F01N 3/035* | (2006.01) |
| *F02D 41/00* | (2006.01) |
| *F02D 41/02* | (2006.01) |
| *F02B 37/18* | (2006.01) |
| *F02D 13/02* | (2006.01) |
| *F01N 13/00* | (2010.01) |
| *F01N 3/023* | (2006.01) |

(Continued)

(52) U.S. Cl.
CPC .......... *F01N 3/035* (2013.01); *F01N 3/0236* (2013.01); *F01N 3/103* (2013.01); *F01N 3/106* (2013.01);

(Continued)

(58) Field of Classification Search
CPC ......... F02B 37/18; F02M 26/06; F01N 3/035; F01N 3/0236; F01N 3/2033
See application file for complete search history.

(56) References Cited

U.S. PATENT DOCUMENTS 4,404,804 A * 9/1983 Tadokoro .................. F01N 3/22
                                                                                60/280
6,324,847 B1 * 12/2001 Pierpont .................. F02B 37/02
                                                                                415/116

(Continued)

FOREIGN PATENT DOCUMENTS

| JP | 2003-106140 | 4/2003 |
| JP | 2005-291044 | 10/2005 |

(Continued)

OTHER PUBLICATIONS

Japanese Official Action (Jan. 15, 2019)(translation) for corresponding Japanese App. 2017-080665.

*Primary Examiner* — Ngoc T Nguyen
(74) *Attorney, Agent, or Firm* — WRB-IP LLP

(57) ABSTRACT

An internal combustion engine system includes a cylinder block with a plurality of cylinders, a gas intake manifold for providing at least air to the cylinder block and an exhaust gas manifold for exiting the exhaust gas from the cylinder block, wherein the exhaust gas manifold includes at least a main exhaust gas outlet and a waste gate exhaust gas outlet, wherein the main exhaust gas outlet is connected to a main exhaust gas pipe for guiding the exhaust gas to a main exhaust gas after treatment system and the waste gate exhaust gas outlet is connected to a waste gate exhaust gas pipe, and wherein the waste gate exhaust gas pipe is reconnected to the main exhaust gas pipe upstream of the main exhaust gas after treatment system and includes at least one waste gate exhaust gas after treatment unit, such as an oxidation catalyst such as a diesel oxidation catalyst, for (Continued)

catalytically treating the exhaust gas streaming through the waste gate exhaust gas pipe, and to a method for increasing the temperature in an internal combustion engine system.

19 Claims, 9 Drawing Sheets

(51) Int. Cl.
  F02M 26/15 (2016.01)
  F02M 26/01 (2016.01)
  F01N 3/10 (2006.01)
  F01N 3/20 (2006.01)
  F02D 41/40 (2006.01)
  F02M 26/05 (2016.01)
  F02M 26/06 (2016.01)

(52) U.S. Cl.
  CPC ............. *F01N 3/20* (2013.01); *F01N 3/2033* (2013.01); *F01N 13/0093* (2014.06); *F02B 37/18* (2013.01); *F02D 13/0242* (2013.01); *F02D 13/0273* (2013.01); *F02D 41/0055* (2013.01); *F02D 41/0065* (2013.01); *F02D 41/0087* (2013.01); *F02D 41/024* (2013.01); *F02M 26/01* (2016.02); *F02M 26/15* (2016.02); *F01N 2250/02* (2013.01); *F01N 2410/06* (2013.01); *F02D 41/025* (2013.01); *F02D 41/405* (2013.01); *F02M 26/05* (2016.02); *F02M 26/06* (2016.02); *Y02A 50/2325* (2018.01); *Y02T 10/144* (2013.01); *Y02T 10/18* (2013.01); *Y02T 10/26* (2013.01); *Y02T 10/47* (2013.01)

(56) References Cited

U.S. PATENT DOCUMENTS

| | | | |
|---|---|---|---|
| 2002/0134072 A1* | 9/2002 | Fujieda | F01N 3/20 60/280 |
| 2003/0121249 A1* | 7/2003 | Foster | B60H 1/00314 60/285 |
| 2004/0065278 A1* | 4/2004 | Nishimoto | F01L 1/143 123/58.8 |
| 2004/0083715 A1* | 5/2004 | Le Leux | F01N 3/08 60/280 |
| 2004/0231650 A1* | 11/2004 | Gray, Jr. | F01N 3/035 123/568.12 |
| 2007/0214772 A1* | 9/2007 | England | F02D 41/0245 60/285 |
| 2010/0037607 A1* | 2/2010 | Doring | F01N 3/0231 60/602 |
| 2011/0126812 A1* | 6/2011 | Miyashita | F01N 13/107 123/703 |
| 2012/0060492 A1* | 3/2012 | Pursifull | F02D 13/0249 60/602 |
| 2012/0291431 A1* | 11/2012 | Bucknell | F01N 3/0835 60/602 |
| 2014/0109553 A1* | 4/2014 | Roberts, Jr. | F01N 3/0814 60/274 |

FOREIGN PATENT DOCUMENTS

| | | | | |
|---|---|---|---|---|
| JP | 2008-505281 | | 2/2008 | |
| JP | 2008-274954 | | 11/2008 | |
| JP | 2009-103064 | | 5/2009 | |
| JP | 2010-071203 | | 4/2010 | |
| JP | 2010-223064 | | 10/2010 | |
| JP | WO 2010116541 A1 * | 10/2010 | ............ F01N 3/0835 |
| JP | WO 2011101891 A1 * | 8/2011 | ............ F01N 3/101 |

* cited by examiner

INTERNAL COMBUSTION ENGINE SYSTEM AND METHOD FOR INCREASING THE TEMPERATURE IN AT LEAST ONE PART OF THE INTERNAL COMBUSTION ENGINE SYSTEM

The present application is a divisional of U.S. application Ser. No. 14/349,338, filed Apr. 3, 2014, which is the U.S. national stage of International App. PCT/SE2011/000172, filed Oct. 3, 2011, both of which are incorporated by reference.

BACKGROUND AND SUMMARY

The present invention relates to an internal combustion engine system, a method for increasing the temperature in such a system and a vehicle comprising and/or operating such a system.

At current and future emission levels for internal combustion engines in vehicles, particularly for heavy duty diesel engines, after treatment of the exhaust gas has increased in importance for both emissions and overall fuel consumption. Also drivability and dependability of the vehicles are affected by the different methods used, to fulfill these emission standards.

One of the known methods is the use of a so called exhaust gas aftertreatment system usually in form of a catalyst or particle filter. These catalytic aftertreatment systems are operated within a suitable temperature range, for example 250° C.-450° C., which is easily maintained during normal driving conditions of a vehicle.

However, when cold starting the engine or under certain engine operation modes, the actual temperature is too low for said temperature range to be maintained.

Thus, one of the most challenging tasks for running an internal combustion engine system with an exhaust gas aftertreatment system is to increase and maintain the temperature in the exhaust gas aftertreatment system at a working temperature during temperature critical operation situations, so that the emission requirements may be met.

Besides the cold start situation, when the vehicle is started after the engine has been stopped, there are certain other temperature critical engine operating conditions of an internal combustion engine where the actual exhaust gas temperature is too low for said temperature range to be able to be maintained. These temperature critical operating conditions are hereinafter referred to as "low load, idle or motoring engine operation modes" and are described more in detail in the following paragraphs.

The "idle engine operation condition" describes all engine operation modes, where the engine is running at idle speed. Idle speed is the rotational speed the engine runs on when the engine is decoupled from the drivetrain and the accelerator of the internal combustion engine is released. Usually, the rotational speed is measured in revolutions per minute, or rpm, of the crankshaft of the engine. At idle speed, the engine generates enough power to run reasonably smoothly and operate its ancillary equipment (water pump, alternator, and, if equipped, other accessories such as power steering), but usually not enough to perform heavy work, such as moving the vehicle. For vehicles such as trucks or cars, idle speed is customarily between 600 rpm and 1,000 rpm. Even if the accelerator is released, a certain amount of fuel is injected into the internal combustion engine in order to keep the engine running.

If the engine is operating a large number of accessories, particularly air conditioning, the idle speed must be raised to ensure that the engine generates enough power to run smoothly and operate the accessories. Therefore most engines have an automatic adjustment feature in the carburetor or fuel injection system that raises the idle speed when more power is required.

The "low load or motoring engine operation mode" is defined as an engine-operation mode, where the engine is running above a certain rotational speed (rpm), but no fuel is injected into the engine. One example of a motoring engine operation mode is when the engine is dragging, i.e. when a vehicle—which is normally driven by the engine—is coasting down a hill. During that mode the accelerator is also released, but the engine remains coupled to the drivetrain and the engine is kept running by the drive force of the gearbox main shaft.

During the above described engine operation modes, the engine is in principle pumping fresh air at ambient temperature to the exhaust system, whereby, disadvantageously, the exhaust gas aftertreatment system is "air cooled" in an uncontrolled (and unwanted) manner.

This in turn means that the temperature in the catalytic exhaust gas aftertreatment system drops rapidly below 250° C., so that an effective exhaust gas after treatment cannot be provided any more.

Increased emission control requirements have therefore often resulted in a loss of efficiency of the internal combustion engine. It is therefore important to provide methods which allow effective exhaust emission control without adversely affecting the efficiency of the engine and the overall fuel consumption of the vehicle.

Another approach for providing an efficient internal combustion engine with the required low emission is using the so called partial premised combustion (PPC). PPC can simplified be described as running a compression ignition engine on fuel with a low cetane number e.g. on naphtha or kerosene. The low cetane fuel works fine at medium or high load but the combustion quality is not acceptable at low loads idle and/or motoring engine operation modes. Therefore PPC can also be regarded as provoking a temperature critical operation situation, particularly, during cold start, idle and low load driving situations, when a problem with excessive hydrocarbon compounds (HC) and carbon monoxide (CO) engine emissions occurs.

As mentioned above, HC and CO emission is not a problem if the exhaust gas after treatment system is active. But the conversion efficiency drops to unacceptable levels when the catalyst temperature drops below 250° C. Consequently it is required to maintain the temperature of the exhaust gas aftertreatment system at temperatures above 250° C. even at low loads or during idle or motoring engine operation modes and/or to heat up the exhaust gas aftertreatment system rapidly.

It is therefore desirable to provide an internal combustion engine system and a method for controlling an internal combustion engine system, with which the temperature in the exhaust gas aftertreatment system may be increased to a working temperature rapidly and/or maintained in a working temperature range for a long time.

According to a first aspect of the invention, the object is solved by an internal combustion engine comprising a cylinder block with a plurality of cylinders, a gas intake manifold for providing at least air to the cylinder block and an exhaust gas manifold for exiting the exhaust gas from the cylinder block. The exhaust gas manifold comprises at least a main exhaust gas outlet and a waste gate exhaust gas outlet, wherein the main exhaust gas outlet is connected to a main exhaust gas pipe for guiding the exhaust gas to a main exhaust gas aftertreatment system and the waste gate exhaust gas outlet is connected to a waste gate exhaust gas pipe. Inventively, the waste gate exhaust gas pipe is reconnected to the main exhaust gas pipe upstream of the main exhaust gas aftertreatment system and comprises at least one waste gate exhaust gas aftertreatment unit, preferably an oxidation catalyst such as a diesel oxidation catalyst, for catalytically treating the exhaust gas streaming through the waste gate exhaust gas pipe. The main exhaust gas aftertreatment system may comprises at least one of the group comprising an oxidation catalyst, a particulate filter, and a selective catalytic reduction reactor.

The waste gate exhaust gas aftertreatment unit, particularly the diesel oxidation catalyst (DOC) or any other suitable exhaust gas aftertreatment unit uses O2 (oxygen) in the exhaust gas stream to convert CO (carbon monoxide) to CO2 (carbon dioxide) and HC (hydrocarbons) to H2O (water) and CO2. This conversion process is exothermic and therefore produces sufficient heat which in turn increases the temperature of the overall exhaust gas, so that a main exhaust gas aftertreatment system arranged downstream of the reconnection of main exhaust gas pipe and waste gate exhaust gas pipe may be maintained at or brought to its the working temperature, preferably a temperature above 250° C. The resulting temperature may additionally be controlled by the amount of exhaust gas streaming through the waste gate exhaust gas pipe, which in turn may be controlled by a waste gate exhaust gas outlet valve and/or the diameter of the waste gate exhaust gas pipe.

The waste gate exhaust gas aftertreatment unit is further adapted to produce exhaust gas with sufficient heat for initializing the exothermic catalytic reaction in the main oxidation catalyst. For initializing the exothermic reactions in the waste gate oxidation catalyst and/or in the main oxidation catalyst a certain amount of unburned fuel—providing the hydrocarbon source—is necessary.

According to a further preferred embodiment, the waste gate oxidation catalyst and the main oxidation catalyst may be configured to be the same unit. Preferably the integrated oxidation catalyst comprises a first entry which is in connection with the waste gate exhaust gas pipe and a second entry which is in connection with the main exhaust gas pipe. Thereby, the first entry is preferably arranged upstream of the second entry.

According to a further preferred embodiment, the unburned fuel may be provided by a fuel injector arranged in or at the waste gate exhaust gas pipe.

Additionally or alternatively, unburned fuel may be provided by a so called very late post injection, where fuel is injected into at least one cylinder of the cylinder block at the end of the combustion stroke so that the fuel is not ignited. Since very late injection strategies are known for creating oil dilution problems, they should be used only sparingly. However, using this method to kick-start the waste gate aftertreatment unit does not take long and is expected to not create problems with oil dilution. During PPC combustion, which will be described in detail below, this problem does not occur due to the high volatility of the PPC fuel. With PPC there is no need to limit the use of very late post injections for oil dilution reasons.

The very late post injection has the further advantage that a right timing of the very late post injection allows for the fuel being pretreated in the cylinder, whereby the hydrocarbons of the injected fuel are converted to lighter hydrocarbons, CO and H2 (hydrogen). Advantageously, the lighter hydrocarbons are easier to ignite in the oxidation catalyst than the hydrocarbons of the injected fuel. Further, in case the internal combustion engine is controlled to provide sufficient CO at the waste gate aftertreatment unit, the waste gate aftertreatment unit may already ignite around 150° C. For maximizing the production of CO, the air to fuel ratio Lambda maybe controlled for providing a corresponding condition in the waste gate exhaust gas pipe, preferably a slightly rich condition.

Lambda ($\lambda$) is the ratio of actual air to fuel ratio to the stoichiometric air to fuel ratio for a given mixture. Consequently, Lambda is independent on variations in the fuel mixture, since the composition of common fuels may vary seasonally, and many modern vehicles may handle different fuels. A stoichiometric mixture has just enough air to completely burn the available fuel. Lambda of 1.0 indicates a stoichiometric mixture, rich mixtures are less than 1.0, and lean mixtures are greater than 1.0.

As soon as the waste gate oxidant catalyst is ignited, it is possible to terminate the very late post injection and to operate the internal combustion engine on rich conditions. The rich combustion condition provides enough heat and unburned fuel for initializing operation in the main oxidation catalyst. Further, the rich combustion may pre-treat the fuel to make it easier to ignite. As with the very late post injection, a Lambda is suitable for maximizing the production amount of CO and H2 relative to HC. This is a suitable strategy just after the waste gate aftertreatment unit has ignited in order to support ignition of the at least one main exhaust gas aftertreatment unit. When the main exhaust gas aftertreatment unit has been ignited, the conditions in the waste gate exhaust gas pipe may typically be at least slightly rich for heat up of the main exhaust gas aftertreatment unit, rapidly. The preferred steps for cold starting the internal combustion engine will be described in detail later on.

During motoring engine operation conditions, the waste gate exhaust gas pipe and the waste gate exhaust gas aftertreatment unit may be used as so called "pilot flame" for an air cooled exhaust gas aftertreatment system by instantly providing sufficient heat for reinitializing the catalytic reaction in the main exhaust gas aftertreatment system. For restarting the main exhaust gas aftertreatment system also the above and more detailed later on described method may be used.

According to a further embodiment, a turbocharger is arranged at or near the main exhaust gas outlet. The inventive waste gate exhaust gas pipe then works as bypass to a turbocharger. Advantageously, bypassing the turbocharger also increases the heat in the main exhaust gas pipe, since the turbocharger provides a massive thermal inertia which cools down the exhaust gas during idle or motoring engine operation modes or consumes a major amount of thermal energy from the exhaust gas for warming up from at cold start Bypassing the turbocharger provides uncooled exhaust gas to the main exhaust gas aftertreatment system. Using a two stage turbocharger increases the cooling phenomenon, since the low pressure turbine is usually quite big and heavy.

Since the temperature problem only occurs during certain temperature critical situations, it is preferred if the waste gate exhaust gas pipe may further comprises a valve which is adapted to control the amount of exhaust gas streaming through the waste gate exhaust gas pipe, so that during medium or high load engine operation modes, the waste gate exhaust gas pipe may be closed.

According to a further preferred embodiment, the waste gate fuel injector may be used for a burner for increasing the temperature of the exhaust gas in the waste gate exhaust gas pipe, directly. Thereby, the exhaust gas temperature in the waste gate exhaust gas pipe is high enough for increasing the overall temperature of the exhaust gas streaming through the first-exhaust gas pipe and the waste gate exhaust gas pipe.

According to a further preferred embodiment, the fuel injector and/or the at least one exhaust gas aftertreatment unit are in close vicinity to the exhaust gas manifold for capturing the pulse energy of the exhaust pulse. The pulse energy may enhance the mixing of the exhaust gas and of the injected fuel.

According to a further preferred embodiment, the plurality of cylinders of the cylinder block is arranged in at least a first cylinder group and a second cylinder group. Preferably, each cylinder group comprises an intake throttle, which is adapted to be separably operable. Optionally, the intake manifold may comprise a first intake manifold part which is assigned to the first cylinder group and a second intake manifold part which is assigned to the second cylinder group. This arrangement enables the internal combustion engine system to be control led in such a way that during temperature critical engine operation situations, the first cylinder group is not provided with fuel, thereby constituting an inactive cylinder group and that the second cylinder group is provided with fuel, thereby constituting an active cylinder group. The active second cylinder group produces sufficient hot exhaust gas for maintaining the main exhaust gas aftertreatment system in its working temperature range, particularly since the amount of fresh air at ambient temperature is also reduced due to the reduced overall volume of pumped gas of the inactive cylinders.

According to a further preferred embodiment, the exhaust gas manifold is adapted to provide in the exhaust gas manifold a first exhaust gas flow from the first cylinder group, preferably to the first exhaust gas outlet and a second exhaust gas flow from the second cylinder group, preferably to the second exhaust gas outlet. Since the exhaust gas from the first cylinder group and the second cylinder group axe not mixed in the exhaust gas manifold, but guided to the respective exhaust gas outlets, the temperature in the waste gate exhaust gas pipe may be increased even further since only hot exhaust gas from the active second cylinder group is directed to the waste gate exhaust gas pipe. Particularly during low load engine operation modes, the temperature of the exhaust gas of the active cylinder group is even higher than during operation of all cylinders at low load, since the power provided by all cylinders is now provided only by the active cylinder group. This in turn means that the load in the active cylinder group needs to be increased from low load to medium or even high load, which in turn increases the temperature of the exhaust gas of the active cylinder group.

According to a further preferred embodiment, the exhaust gas flow separation may be achieved by providing a separation element in the exhaust gas manifold, so that the exhaust gas manifold is adapted to provide a first exhaust gas manifold part which is assigned to the first exhaust gas outlet and a second exhaust gas manifold part which is assigned to die second exhaust gas outlet.

According to a further preferred embodiment, the exhaust gas manifold is further adapted to provide a third exhaust gas flow through a third exhaust gas pipe (70, shown in phantom in FIG. 1), wherein the third exhaust gas pipe is preferably assigned to the second exhaust gas manifold part. Further, the third exhaust gas pipe is adapted to provide exhaust gas to at least one turbocharger unit. Preferably, the first and the third exhaust gas pipe may be adapted to provide exhaust gas to the same turbocharger unit, wherein preferably the turbocharger unit comprises a dual entry turbine. The use of a dual entry turbine reduces the overall components in a vehicle and thereby reduces the overall weight which in turn reduces fuel consumption and increases the vehicle payload possibility. Additionally, a dual entry turbine increases the turbine efficiency since smaller turbocharger components always have lower efficiencies.

According to a further preferred embodiment, the internal combustion engine system further comprises an exhaust gas recirculation (EGR) system for recirculating at least part of the exhaust gas to the gas intake side of the internal combustion engine, wherein preferably the exhaust gas is branched off directly from the exhaust gas manifold or is branched off from the main and/or third exhaust gas pipe downstream of a turbocharger unit and preferably upstream of at least one unit of the main exhaust gas aftertreatment system, particularly upstream of a selective reduction reactor but preferably downstream of a particle filter unit for recirculating filtered exhaust gas.

Advantageously, the EGR reduces the emission of the combustion engine, particularly the quantity of nitrogen oxide in the exhaust gases. Preferably, the recirculated sub-flow of exhaust gas is cooled before fed into the gas intake side of the EGR engine, where it is mixed with incoming air before the mixture is introduced into the cylinders of the EGR engine. Cooling of the recirculated exhaust gas is a prerequisite for the EGR engines as recirculating hot exhaust gas would increase the temperature of the gas at the gas intake side of the EGR engine to a level which could damage the EGR engine. Moreover, recirculation of exhaust gas amounts in a wide range of 10% to 90%, dependent on e.g. engine load and engine operation mode of the total mass flow through the EGR engine is required for yielding a sufficient NOx reduction.

According to a further preferred embodiment, the internal combustion engine system further comprises an exhaust gas recirculation duct, which is branched off from the main exhaust gas manifold part which is assigned to the first inactive cylinder group and is adapted to recirculate exhaust gas to the intake manifold, preferably to the second intake manifold part which is assigned to the second active cylinder group. This arrangement advantageously forces exhaust gas from the inactive cylinder group, which is more or less air under the regarded circumstances, to flow from the exhaust gas manifold of the inactive cylinder group to the intake manifold of the active cylinder group so that the overall amount of air flow through the engine is significantly reduced. Thereby the air cooling effect during temperature critical engine operation modes may be further reduced.

According to a further preferred embodiment, the internal combustion engine is adapted to be operated by a less ignitable fuel, particularly by a fuel having a low cetane number such as a cetane number below 38 and/or is adapted to ignite the fuel at a compression ratio in the range between 10:1 mid 30:1, preferably between 13:1 and 25:1, and most preferably between 15:1 and 18:1. As mentioned above, running an engine by less ignitable fuel creating, so called partial premixed combustion (PPC), also provokes temperature critical situation, particularly during low load or idle engine operation modes. The above described inventive features of the internal combustion engine system allow for an increased temperature in the cylinders and/or the exhaust gas and may be also used for PPC engines.

A further aspect of the present invention regards methods for controlling an internal combustion engine system, so that the temperature in at least one part of the internal combustion engine system is increased during a temperature critical operation situation such as running the internal combustion engine with less ignitable fuel, and/or a cold start situation and/or a low load engine operation mode and/or an idle engine operation mode and/or a motoring engine operation mode. As mentioned above, the internal combustion engine may comprise a cylinder block with a plurality of cylinders, wherein the plurality of cylinders of the cylinder block are arranged in at least a first cylinder group and a second cylinder group, a gas intake manifold for providing at least air to the first and second cylinder group and an exhaust gas manifold for exiting the exhaust gas from the cylinder block to a main exhaust gas aftertreatment system.

According to a first aspect of the present invention, a preferred embodiment of the method comprises the steps of: Determining whether the internal combustion engine system is operated in the temperature critical situation; and, in case the internal combustion engine system is operated in the temperature critical situation, controlling the first cylinder group to be inactive by providing no fuel to the cylinders of the first cylinder group, and controlling the second cylinder group to be active by providing fuel to the cylinders of the second cylinder group.

Advantageously, instead of pumping fresh air at ambient temperature through all cylinders and thereby cooling the whole internal combustion engine system below its working temperature range during temperature critical operation modes, fresh air is only pumped through part of the cylinders, whereby the amount of fresh air is reduced. Additionally, operating the remaining part of the cylinders with fuel provides hot exhaust gas, but does not increase the fuel consumption unduly. Preferably, the number of cylinders is divided evenly into half, but any other division is also possible.

According to a further preferred embodiment of the inventive method, each cylinder of the internal combustion engine system further comprises at least one intake valve for opening the corresponding cylinder to the intake manifold and at least one exhaust valve for opening the corresponding cylinder to the exhaust manifold, the method further comprising the step of increasing the temperature in at least one cylinder by con trolling the exhaust valve of the at least one cylinder to be at least partially open at the same time as the intake valve is opened, thereby rebreathing a predetermined amount of exhaust gas into the cylinder.

Advantageously, the rebreathing of the exhaust gas will reduce the air mass flow which in turn increases the temperature of the exhaust gas system. Additionally, the fuel penalty is low.

Preferably, the rebreathing is not performed on all cylinders, but only on the first cylinder group of inactive cylinders, which increases the temperature in the inactive cylinders and therefore also in the exhaust gas. The rebreathing mechanism may be achieved by e.g. an additional cam lobe and/or by a cam phaser in case the internal combustion engine has a separate exhaust cam.

According to a further preferred embodiment at least one cylinder or at least one cylinder group of the internal combustion engine system further comprises an intake throttle for controlling the amount of intake gas into the at least one cylinder or the at least one cylinder group, the method further comprising the step of reducing the amount of intake gas into the inactive cylinder group, wherein preferably the amount of intake gas is almost zero or zero. Thereby, intake of fresh air may be reduced to a much greater extend without over-throttling the engine. Excessive throttling of the engine without exhaust rebreathing would create an underpressure that sucks oil into the cylinder combustion chamber from the sump According to a further aspect of the invention relates to a method for increasing the temperature in an internal combustion engine system during a temperature critical operation situation such as running the internal combustion engine with less ignitable feel and/or a cold start situation and/or a low load engine operation mode and/or an idle engine operation mode and/or a motoring engine operation mode, wherein the internal combustion engine comprises a cylinder block with a plurality of cylinders, a gas intake manifold for providing at least air to the first and second cylinder group and an exhaust gas manifold for exiting the exhaust gas from the cylinder block. The exhaust gas manifold comprises at least a main exhaust gas outlet and a waste gate exhaust gas outlet, wherein the main exhaust gas outlet is connected to a main exhaust gas pipe for guiding the exhaust gas to a main exhaust gas aftertreatment system and the waste gate exhaust gas outlet is connected to a waste gate exhaust gas pipe, wherein the waste gate exhaust gas pipe is reconnected to the main exhaust gas pipe upstream of the main exhaust gas aftertreatment system and comprises at least one waste gate exhaust gas aftertreatment unit, preferably an oxidation catalyst such as a diesel oxidation catalyst, for catalytically treating the exhaust gas streaming through the waste gate exhaust gas pipe. Inventively, the method comprises the steps of: Determining whether the internal combustion engine is operated in the temperature critical situation; and in case the internal combustion engine is operated in the temperature critical situation opening the waste gate exhaust gas pipe and operating the at least one waste gate exhaust gas aftertreatment unit waste gate exhaust gas pipe.

As mentioned above, the waste gate exhaust gas aftertreatment unit, particularly the diesel oxidation catalyst (DOC) or any other suitable exhaust gas aftertreatment unit uses O2 (oxygen) in the exhaust gas stream to convert CO (carbon monoxide) to CO2 (carbon dioxide) and HC (hydrocarbons) to H2O (water) and CO2. This conversion process is exothermic and therefore produces sufficient heat which in turn increases the temperature of the overall exhaust gas, so that a main exhaust gas aftertreatment system arranged downstream of the reconnection of main exhaust gas pipe and waste gate exhaust gas pipe may be maintained at or brought to its the working temperature, preferably a temperature above 250° C.

As also mentioned above, the waste gate exhaust gas pipe provides a bypass to a turbine of a turbocharger or at least a turbocharger unit which may be arranged in the main exhaust gas pipe. Since the exhaust gas streaming through the waste gate exhaust gas pipe is not used for heating the turbocharger, the overall heat of the exhaust gas may be increased. Additionally a feet injector or a so called very late post injection may be used as hydrocarbon source for the waste gate exhaust gas aftertreatment unit.

Preferably, the main exhaust gas outlet is assigned to a first cylinder group, and the waste gate exhaust gas outlet and the optional third exhaust gas outlet are arranged at a second cylinder group, wherein the main and preferably the third exhaust gas outlet are connected to the first exhaust gas pipe and the waste gate exhaust gas outlet is connected to the waste gate exhaust gas pipe.

According to a further preferred embodiment of the inventive method, at least one step of the above described rebreathing and at least one step of bypassing the turbocharger by means of the waste gate exhaust gas pipe are performed. This minimizes the amount of cold air flowing through the internal combustion engine system and therefore increases the temperature in the exhaust gas.

Preferably, the exhaust rebreathing is performed on the first cylinder group of inactive cylinders. Advantageously, this avoids pumping back exhaust gases through the waste gate exhaust gas pipe.

According to a further preferred embodiment, each cylinder may comprise a cylinder fuel injector for injecting at least feel into the cylinders, wherein the cylinder fuel injector of at least one cylinder, preferably of at least one cylinder of the second active cylinder group, is controlled to inject feel at at least two times per combustion stroke, wherein preferably the second injection is significantly later than the first injection, preferably at least 10 crank angle degrees later than fee first injection, most preferably at least 20 crank angle degrees later than the first injection.

This so called late post injection has the advantage that instead of injecting the whole amount of fuel at one time, the fuel amount is split into at least two injections, wherein the second injection is significantly later than the first injection, which increases the exhaust gas temperature. However care should be taken that a too late second injection may have the consequence that the fuel does not ignite. This might be wanted for adjusting the air to fuel ratio and is called very late post injection in this document—see above. The second injection advantageously increases the temperature to the exhaust gases by boosting the temperature rapidly and for a short period of time so that the fuel penalty is acceptable.

It goes without saying that also a very late post injection as described above may be performed for generating CO and H2 and igniting the oxidation catalyst(s) at low temperature, preferably at a temperature around 150° C.

According to a preferred embodiment, an inventive cold starting process (or process performed after a long period of idle engine operation modes) comprises the following steps:

1. Operating the second cylinder group with late post injection
2. When the temperature of the exhaust gas in the waste gate exhaust gas pipe or at the waste gate exhaust gas aftertreatment unit has been reached roughly 150° C., operating the second cylinder group with a very late post injection for producing CO and H2, preferably using a suitable air to fuel ratio for maximizing the CO and H2 content in the exhaust gas.
3. Initializing operation (igniting) of the waste gate exhaust gas aftertreatment unit at roughly 150° C. due to the presence of CO and H2 in the exhaust gas of the waste gate exhaust gas pipe.
4. Terminating very late post injection and initializing operation of the waste gate fuel injector.
5. Maintaining thereby conditions in the waste gate exhaust gas pipe close to a stoichiometric mixture of fuel and air for initializing operation of the main exhaust gas aftertreatment system at roughly 150° C. due to the presence of CO and H2.
6. After ignition of the main exhaust gas aftertreatment system, increasing the fuel amount at the waste gate fuel injector for providing at least slightly rich, preferably rich conditions in the waste gate exhaust gas pipe for providing unburned fuel to the main oxidation catalyst, which in turn result in rapid heating of the main exhaust gas aftertreatment system.
7. Optionally, operating the first cylinder group for providing sufficient power if required.

According to a further preferred embodiment, the first cylinder group comprises at least: one first intake throttle, and the second cylinder group comprises at least one second intake throttle, which are adapted to be separably operable, the method further comprising the step of: during the temperature critical situation controlling the first intake throttle of the first cylinder group and the second intake throttle of the second cylinder group to throttle the first cylinders of the first cylinder group to a greater extent than the second cylinders of the second cylinder group.

Throttling the air intake, particularly to the first cylinder group of inactive cylinders reduces the overall amount of fresh air being pumped through the cylinders. Particularly advantageous is the combination of at least one step of the exhaust rebreathing method and the step of intake throttling, as it provides powerful flow control and reduces the amount of fresh air in the internal combustion engine system, significantly. Thereby, the temperature of the exhaust gas may be increased.

According to a further preferred embodiment, the inventive method may further comprise the step of recirculating at least part of the exhaust gas to the gas intake side of the internal combustion engine, wherein the internal combustion engine system further comprises an exhaust gas recirculation (EGR) system for recirculating at least part of the exhaust gas to the gas intake side of the internal combustion engine, wherein preferably the exhaust gas is branched off from the main and/or third exhaust gas pipe downstream of a turbocharger unit and preferably upstream of the main exhaust gas aftertreatment system, or is branched off directly from the exhaust gas manifold.

Recirculating at least part of the exhaust gas during temperature critical situations may increase the temperature of the exhaust gas since the intake of fresh air may be reduced. The warm exhaust gas streams through the cylinders and subsequently through the exhaust gas and avoids cooling down of the internal combustion engine system and particularly of the exhaust gas aftertreatment system.

According to a further aspect, the invention relates to a method for increasing the temperature in an internal combustion engine system during a temperature critical operation situation such as running the internal combustion engine with less ignitable fuel, and/or a cold start situation and/or a low load engine operation mode and/or an idle engine operation mode and/or a motoring engine operation mode, wherein the internal combustion-engine system comprises a cylinder block with a plurality of cylinders, wherein the plurality of cylinders of the cylinder block are arranged in at least a first cylinder group and a second cylinder group, a first gas intake manifold part which is assigned to the first cylinder group for providing at least air to the first cylinder group, a second gas intake manifold part, which is assigned to tire second cylinder group for providing at least air to the second cylinder group, a first exhaust gas manifold part for exiting exhaust gas from the first cylinder group, a second exhaust gas manifold part for exiting exhaust gas from the second cylinder group, and an exhaust gas recirculation duct, which connects the first exhaust gas manifold part and the second gas intake manifold part of the internal combustion engine. The inventive method composes the steps of: Determining whether the internal combustion engine is operated in the temperature critical situation; and in case the internal combustion engine is operated in the temperature critical situation recirculating exhaust gas from the first cylinder group to the second cylinder group.

Preferably, the method further comprises the step of controlling the first cylinder group to be inactive by providing no fuel to the cylinders of the first cylinder group, and controlling the second cylinder group to be active by providing fuel to the cylinders of the second cylinder group in case the internal combustion engine system is operated in the temperature critical situation.

Due to the exhaust gas recirculation from the exhaust gas manifold of the inactive (first) cylinder group to the intake manifold for the active (second) cylinder group, air is forced to flow from the first inactive exhaust manifold part to the second active intake manifold part. Additionally throttling the air intake upstream on the active intake manifold, will increase the forced air flow. Consequently, fresh air passes first to the inactive cylinder group and is then fed to the active cylinder group, thereby passing the internal combustion engine twice. Hence, the overall amount of air flowing through the internal combustion engine may be reduced significantly.

This method has the advantage that rebreathing of exhaust gas does not need to be performed for increasing the exhaust gas temperature. Additionally, the problem of accumulation of soot from pulsating EGR with following bad distribution is avoided since the reused air does not necessarily be mixed with recirculated exhaust gas.

Further, by using the above described engine operation method, provides a further method for providing pre-treated fuel. In this case, the fuel may be post injected lately into the first inactive cylinder group and, provided tire injection timing is right, the pre-treated fuel enters then the active cylinders with increased ignitability.

According to a further preferred embodiment, the above described use of pre-treated fuel may also be achieved by using the exhaust rebreathing in combination with exhaust gas recirculation to the active cylinder group. Provided the exhaust rebreathing is performed on the inactive cylinders and not on the active cylinders and there is a common exhaust gas manifold and a common intake manifold for both cylinder groups, exhaust gas from the active cylinder group may foe rebreathed by the inactive cylinder group from the exhaust gas manifold. A rightly timed very late post injection may then provide pre-treated fuel which in turn is provided to the intake manifold of the active cylinder group as fuel with increased ignitability.

It goes without saying that according to further embodiments, also this method may be combined with the above described steps of the bypass method and/or of the rebreathing method. Particularly by combining the bypass method and the method of the reused air, thermal inertia at cold starting may be reduced.

Even if not each and every combination possibility of the method steps and/or system features has been mentioned in detail above, it is clear for a person skilled in the art that the features and steps may be combined in any suitable manner without being inventive.

Further preferred embodiments and advantages are defined in the claims, the figures and the description.

BRIEF DESCRIPTION OF THE DRAWINGS

In the following preferred embodiment of the system and methods according to the invention will be discussed with the help of the attached Figures. The description of the Figures is considered as simplification of the principles of the invention and is not intended to limit the scope of the claims.

The figures show.

In the following same or similarly functioning elements are indicated with the same reference numerals.

DETAILED DESCRIPTION

Figure 1:
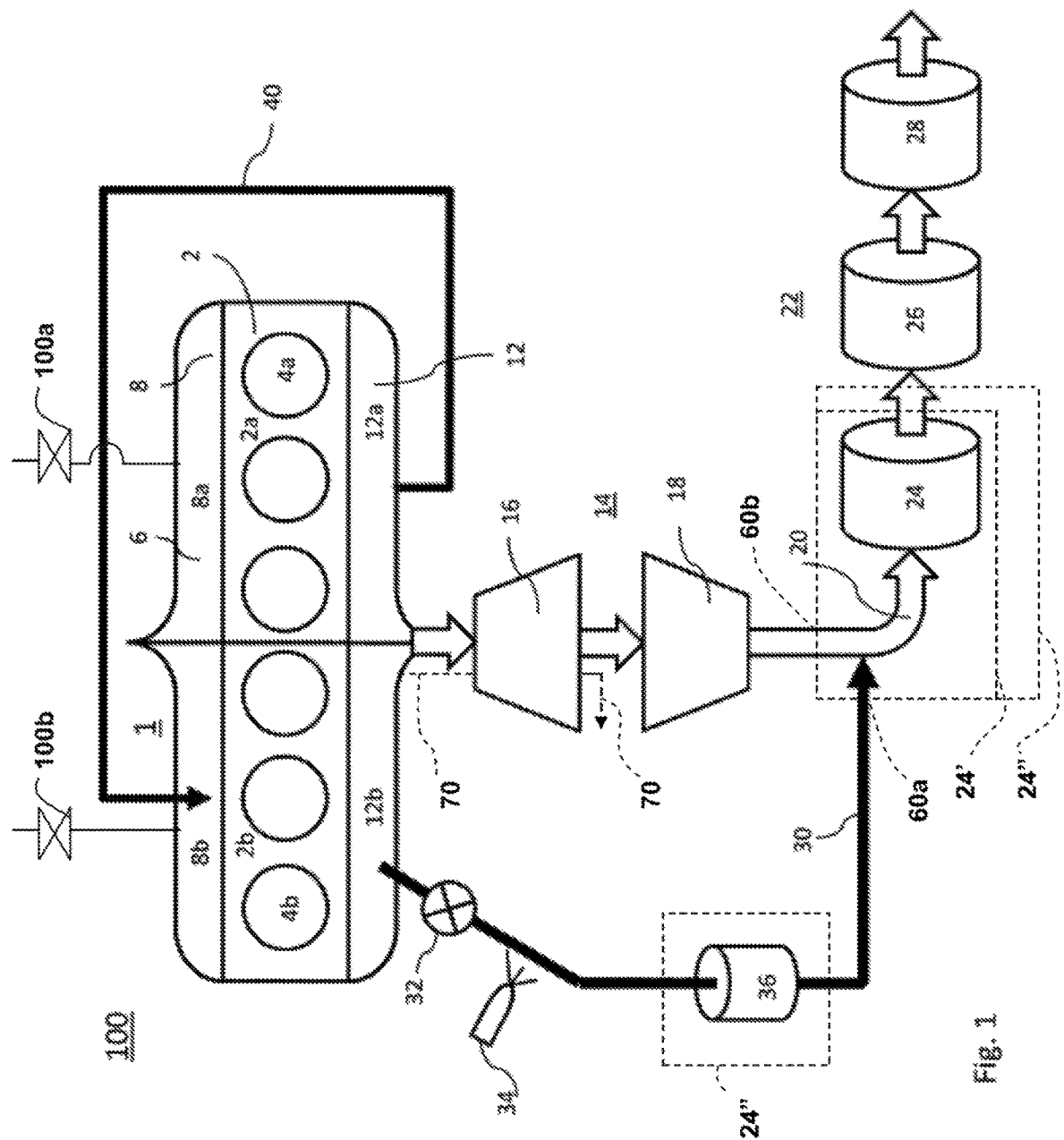
FIG. 1: a schematic illustration of a preferred embodiment of the inventive internal combustion engine system.

In the schematic representation of FIG. 1 an internal combustion engine system 100 is shown which is used in a vehicle (not shown), for example in a truck or bus, or in any other vehicle comprising an internal combustion engine. The engine system 100 comprises an internal combustion engine 1 with a cylinder block 2 having e.g. six piston cylinders 4. Further, the internal combustion engine 1 has a gas intake side 6 with an intake manifold 8 and an exhaust gas outlet side 10 with an exhaust manifold 12. The exhaust gases are led to a turbocharger 14 comprising a first turbine 16 and a second turbine 18 and onward through a main exhaust gas pipe 20 to an exhaust gas aftertreatment system 22.

The exhaust gas aftertreatment system usually composes a plurality of exhaust gas aftertreatment units, such as e.g. a diesel oxidation catalyst 24, a particulate filter 26 and a selective catalytic reactor (SCR) 28.

A SCR unit 26 is a means for converting nitrogen oxides by means of a catalyst into nitrogen and water. An optimal temperature range for these reactions is typically between approximately 250° Celsius and approximately 450° Celsius. This optimal operating temperature can be easily kept during normal (driving) operation modes of the engine.

However, during idle or motoring engine operation modes of the internal combustion engine 1, the temperature of the exhaust gas drops. The reason for that is that fresh air at ambient temperature is fed to the intake manifold 6 of the cylinder block 2, even if combustion is reduced considerably (as in the idle engine operation mode) or no combustion takes place at all (as in the motoring engine operation mode). This in turn means that the internal combustion engine 1 is simply pumping fresh and cool air to the exhaust gas side 8 and onward into the exhaust gas aftertreatment system 22. This cool air causes the exhaust gas aftertreatment system 22 to cool down rapidly below its optimal operating temperature, which in ten results in poor or no exhaust gas purification, so that the required emission levels cannot be achieved.

For increasing the temperature of the exhaust gas streaming through the exhaust gas aftertreatment system 22, a plurality of possibilities will be presented in the following, which may alone or in combination increase the temperature in at least one part of the internal combustion engine system 100.

Even if, in the illustration of FIG. 1 a plurality of different approaches are combined it should be once again explicitly mentioned that the combination is only a preferred embodiment and does nor limit the scope of protection thereto.

According to the invention a first approach for avoiding a temperature drop in the exhaust gas aftertreatment system is given by adding a waste gate exhaust gas pipe 30. The waste gate exhaust gas pipe 30 is preferably branched off from the exhaust gas manifold 12 and may comprise a valve 32 for opening and closing the waste gate exhaust gas pipe 30 or controlling the amount of exhaust gas streaming through the waste gate exhaust gas pipe 30, a fuel injector 34 for injecting fuel into the exhaust gas, and a diesel oxidation catalyst (DOC) 36 for provoking an exothermic reaction with help of the injected fuel. The waste gate oxidation catalyst 36 and the main oxidation device 24 may be configured as an integrated device 24" as shown in phantom in FIG. 1.

Instead of providing a separate waste gate oxidation catalyst 36, i.e. the separate waste gate oxidation catalyst 36 shown in FIG. 1 may be omitted, it is also possible to use at least a part of the main oxidation device 24. For that, the main oxidation catalyst 24' may, as seen in phantom in FIG. 1, have at least two entries, one entry 60a for the waste gate exhaust gas pipe 30 and another entry 60b for the main exhaust gas pipe 20. Preferably, the entry 60a for the waste gate exhaust gas pipe 30 is then arranged upstream of the entry 60b for the main exhaust gas pipe 20.

In the depicted embodiment of FIG. 1, the waste gate exhaust gas pipe 30 is connected to the main exhaust gas pipe 20 downstream of the turbocharger 14, thereby establishing a bypass thereto. Bypassing the turbocharger 14 has the advantage that during a temperature critical situation such as running the internal combustion engine 1 with less ignitable fuel and/or a cold start situation and/or a low load engine operation mode and/or an idle engine operation mode and/or a motoring engine operation mode, the exhaust gas is not cooled down due to warming up the turbocharger 14. Since the turbocharger 14 provides a significant thermal inertia a lot of thermal energy may be lost in this process.

The waste gate exhaust gas pipe 30 works as follows. As soon as a temperature critical situation is detected, the valve 32 opened and a predeterminable amount of exhaust gas from the exhaust gas manifold 2 is allowed to stream into the waste gate exhaust gas pipe 30. Further, the fuel injector 34 is operated and a predeterminable amount of fuel is injected into the exhaust gas streaming through the waste gate exhaust gas pipe 30. Preferably, the fuel injector and/or the valve are arranged in close vicinity to the exhaust gas manifold. This has the advantage that the exhaust gas still comprises a pulsation (triggered by the cylinder movement), which provides good mixing properties of the exhaust gas and of the injected fuel. The fuel/exhaust gas mixture is then guided to a small DOC unit 36, where oxygen O2 in the exhaust gas stream is used to convert carbon monoxide CO to carbon dioxide CO2 and the hydrocarbons HC provided by the injected fuel are converted to water H2O and CO2. Both reactions are exothermic which consequently increases the temperature of the exhaust gas streaming through the waste gate exhaust gas pipe 30.

The exhaust gas streaming through the waste gate exhaust gas pipe 30 is reunited with the cool exhaust gas streaming through the main exhaust gas pipe 20 downstream of the turbocharger 14. The hot exhaust gas from the waste gate exhaust gas pipe 30 provides enough thermal energy to increase the temperature of the complete exhaust gas to such an extent that at least one of the exhaust gas aftertreatment units 24, 26 and/or 28 is in its operation temperature range. Preferably, the exhaust gas temperature now comprises a temperature above the working temperature of the main diesel oxidation catalyst 24. The thermal energy provided by the DOC 24 in turn provides enough heat for the reactions taking place in the selective catalytically reactor 28.

Alternative or additionally, the temperature of the exhaust gas may also be increased by operating only a part of the cylinders 4 during temperature critical situations. Since temperature critical situations often occur at low load or at idle engine operation modes, where no fuel or not enough fuel is injected into the cylinders, it has been suggested by the inventors to "split" the cylinders of cylinder block 2 into a first cylinder group 2a and a second cylinder group 2b. In the embodiment shown in FIG. 1, the cylinders are evenly divided into three+three cylinders. However, any other total number of cylinders or cylinder partition even an uneven partition is possible.

The cylinders 4a of the first cylinder group 2a are controlled to be inactive that means no fuel is injected into the cylinders 4a. The cylinders 4b of the second cylinder group 2b in contrast are controlled to be active. That means the load required for operating the engine in the low load mode is only provided by the second cylinder group 2b. That in turn means that the exhaust gas from the second cylinder group 2b has a significantly higher temperature than the exhaust gas from the first cylinder group 2a, which in turn increases the overall temperature of the whole exhaust gas.

Preferably, also the intake manifold 8 is split into a first part 8a and a second part 8b, whereby both parts comprise a separate intake throttle 100a and 100b for controlling the amount of air flowing into the cylinders. For enhancing the temperature increasing effect, the first intake throttle may reduce the air intake to the first inactive cylinder group 2a to almost zero or zero. Since only a small amount of cold air is allowed to pass the cylinders, the exhaust gas temperature is increased.

Additionally, for further enhancing the temperature increasing effect, it is also advantageous to split the exhaust gas manifold 12 into a first part 12a which is assigned to the first cylinder group 2a of inactive cylinders and into a second pan 12b which is assigned to the second cylinder group 2b of active cylinders 4b. Preferably, the waste gate exhaust gas pipe 30 is arranged to branch off at the second part of the exhaust gas manifold 12b. Thereby, hot exhaust gas is provided to the DOC 36 which further heats up the exhaust gas streaming through the waste gate exhaust gas pipe 30. Thereby, the exhaust gas in the waste gate exhaust gas pipe 30 is heated to such an extent that also the exhaust gas streaming through the first exhaust: gas pipe 20 is beatable to the desired temperature, even if the main part of the exhaust gas streaming through the first exhaust gas pipe 20 is provided by the inactive cylinders.

Preferably, the second part of the exhaust gas manifold 12b comprises an exhaust gas outlet which is adapted also to connect the second exhaust gas manifold part 12b to the turbocharger 14. Preferably, the turbine 16 of the turbocharger is a dual entry turbine which allows supplying exhaust gas from the first cylinder group 2a and the second cylinder group 2b to the same turbocharger 14. Of course it is also possible to use for each cylinder group a separate turbocharger, but this increases the overall weight of the vehicle and the overall number of vehicle parts which ordinarily should be avoided.

Besides the above described possibilities for increasing the temperature, it is also possible to reduce the air intake into the cylinders by recirculating exhaust gas to the gas intake side 6 of the internal combustion engine 1. This may be done with an exhaust gas recirculation (EGR) pipe 40 which may be branched off at the exhaust gas manifold 12 and preferably at the exhaust gas manifold part 2a assigned to the inactive cylinder group 2a. The exhaust recirculation pipe is 40 is further connected at its other side with the intake manifold 8 and preferably with the intake manifold past 8b which b assigned to the active cylinder group 2b.

During temperature critical situations this arrangement enables guiding fresh air through the first inactive cylinder group 2a and then as fresh air to the second active cylinder group 2b. Consequently, the intake of fresh ambient air for the second cylinder group is controlled to be almost zero. Thereby, the overall air intake may be significantly reduced and the tempera lure in the cylinders 4b of the second active cylinder group and later on the temperature of the exhaust gas may further be increased.

Additionally or alternatively, the EGR pipe 40 or a further EGR pipe may be branched off from the first exhaust gas pipe 20 downstream of the turbocharger 14 or even further downstream e.g. between or downstream of the elements of the exhaust gas aftertreatment system 22. In case the EGR pipe is branched off between the elements of the exhaust gas aftertreatment system 22, it is preferred to branch off the EGR pipe downstream of the particulate filter 26 for recirculating cleaned exhaust gas but upstream of the selective catalytic reduction unit 28 for avoiding unwanted components, such as ammonia in the internal combustion engine 1.

For increasing the exhaust gas temperature even further, the internal combustion engine I may be controlled to be operated by a so called post-injection. That means the injection to the preferably active cylinders 4b is split from a single injection to at least two injections, whereby the overall amount of fuel injected into the cylinders remains constant. For instance, instead of injecting ca. 30 mg fuel at once, first ca. 20 mg fuel may be injected and significantly later the remaining ca. 10 mg fuel are injected. In terms of crank angle degrees (CAD) significantly later means at least 10 CAD, preferably at feast 20 CAD later than the first injection, which is usually close to TDC. If advanced injection timing strategies are used with very early injections, then the here mentioned late post injection should be positioned at least 10 CAD after TDC (top dead center) and preferably more than 20 CAD after TDC.

Additionally, a so called very late post injection may be used which provides unburned fuel to the exhaust gas (rich engine operation condition) This engine operation condition further generates an increase amount of CO, which in turn may decrease the ignition temperature of the oxidation catalyst 36, respectively 24. A preferred method for operating the inventive internal combustion engine may comprise the following steps:

1. Operating the second cylinder group with late post injection.
2. When the temperature of the exhaust gas in the waste gate exhaust gas pipe or at the waste gate exhaust gas aftertreatment unit has been reached roughly 150° C., operating the second cylinder group with a very late post injection for producing CO and H2, preferably using a suitable air to fuel ratio for maximizing the CO and H2 content in the exhaust gas.
3. Initializing operation (igniting) of the waste gate exhaust gas aftertreatment unit at roughly 150° C. due to the presence of CO and H2 in the exhaust gas of the waste gate exhaust gas pipe.
4. Terminating very late post injection and initializing operation of the waste gate fuel injector.
5. Maintaining thereby conditions in the waste gate exhaust gas pipe close to a stoichiometric mixture of fuel and air for initializing operation of the main exhaust gas aftertreatment system at roughly 150° C. due to the presence of CO and H2.
6. After ignition of the main exhaust gas aftertreatment system, increasing the fuel amount at the waste gate fuel injector for providing at least slightly rich, preferably rich conditions in the waste gate exhaust gas pipe for providing unburned fuel to the main oxidation catalyst, which in turn result in rapid heating of the main exhaust gas aftertreatment system.
7. Optionally, operating the first cylinder group for providing sufficient power if required In the following the increase in the exhaust temperature using the above described methods will be shortly discussed.
1. Waste Gate Exhaust Gas Pipe (Waste Gate Combustion):

As mentioned above a waste gate exhaust gas pipe 30 for controlling the exhaust gas flow is added to the exhaust gas manifold 12. In the regarded embodiment it is connected to the active cylinders 4b to lead the exhaust gases past the turbines 16, 18 to preserve the energy. In addition to this, a fuel injector 34 together with a small DOC 36 is placed in the waste gate exhaust gas pipe 30 to add the extra energy for igniting the main DOC 24. The fuel injector 34 and the DOC 36 should be placed close to the exhaust gas manifold 12 to maintain the exhaust pulse by capturing the pulse energy. This pulse will be of help when mixing the fuel injected by the fuel injector 34.

As soon as the engine starts (cold start situation) the waste gate exhaust gas pipe 30 is controlled to be opened by valve 32 so that roughly 10% of the overall exhaust gas flow goes through the waste gate exhaust gas pipe 30. These 10% are intended to have a temperature such high that the small DOC 36 is enabled to ignite the fuel injected by the fuel injector 34. The temperature required for this is roughly 250° C. For providing such a temperature fuel should be injected into the active cylinders 4b. After the small DOC 36 has ignited the extra fuel, the exhaust gas coming out front the waste gate exhaust gas pipe 30 is warm enough to give the resulting mixed gas a temperature close too 300° C. which is the temperature needed to keep the main DOC 24 running.

Preferably the waste gate exhaust gas pipe 30 may have a diameter of 30 mm. The flow through the waste gate exhaust gas pipe 30 is controlled by a throttle or valve 32 on the exhaust gas manifold 12. The amount of fuel injected in the fuel injector 36 may be 30 mg/cycle. As soon as the main DOC 24 is warm enough the waste gate exhaust gas pipe 30 is closed and all the exhaust gases pass through the turbocharger 14. This method can be used both when cold starting an engine and when the vehicle is running on low load e.g. going down a long slope.

Simulations have been performed with a fuel injection of 35 mg fuel on the active cylinders 4b and the fuel injector 34 injected additional 40 mg fuel/cycle. This resulted in the required temperature of 250° C. in the waste gate exhaust gas pipe 30 so that the small DOC 36 is enabled to ignite the fuel injected by the fuel injector 34. The total temperature in the exhaust gas pipe 20 then reached 270° C. In case this temperature is not high enough a larger amount of the hot exhaust gas may pass through the waste gate exhaust gas pipe 30. Changing from 11% of the total flow to 20% through the waste gate exhaust gas pipe 30 increased the temperature in the main exhaust gas pipe 20 to 290° C.

This shows that it is possible to reach the tight temperature if only the right amount of fuel is injected from the fuel injector 34 and enough of the gases pass through the waste gate. Work is lost in the process of injecting fuel into the exhaust gases but it gives the gases enough temperature to heat up the main DOC 24 to its working temperature rapidly.

Table 1 shows data based on the following conditions: 600 rpm, 35 mg fuel/active cylinder, 20% through waste gate exhaust gas pipe, 40 mg fuel/cycle from fuel injector 36:

TABLE 1

| | |
|---|---|
| Temp@exhaust[K] | 560 |
| Bmep [g/kW-h] | 0.71171 |
| Shaft Power[kW] | 4.54686 |
| Cyltemp@ignition/max[K] | 920/1207 |
| Temp@group1/group2[K] | 530/350 |

TABLE 1-continued

| | |
|---|---|
| Massflow in[g/s] | 54.3 |
| Inlet Temp@WG-pipe[K] | 520 |

2. Exhaust Rebreathing and Inlet Throttle:

As mentioned above, a second strategy is to use an exhaust rebreathing mechanism called bump to pump some exhaust gas back into the cylinders 4 by lifting the exhaust valve (not shown) while the intake valve (not shown) is open. This will lower the engines mass flow and thus letting the temperature build up in the system. As discussed above, this method may also be run on part of the cylinders to minimize the fuel consumption. When only injecting fuel on a part of the cylinders 4b a throttle on the inactive cylinders 4a without injection could be used to increase the exhaust temperature even further since the throttle is preventing the inactive cylinders 4b to pump cold air through the internal combustion engine 1. Different bumps may be used. The valve lift profile called "bump0" opens the exhaust valve as the inlet valve at maximum lift. The valve lift profiles called "bump1", "bump2" and "bump3" reopens the exhaust valve closer to the end of the inlet valve lift.

Figure 2A:
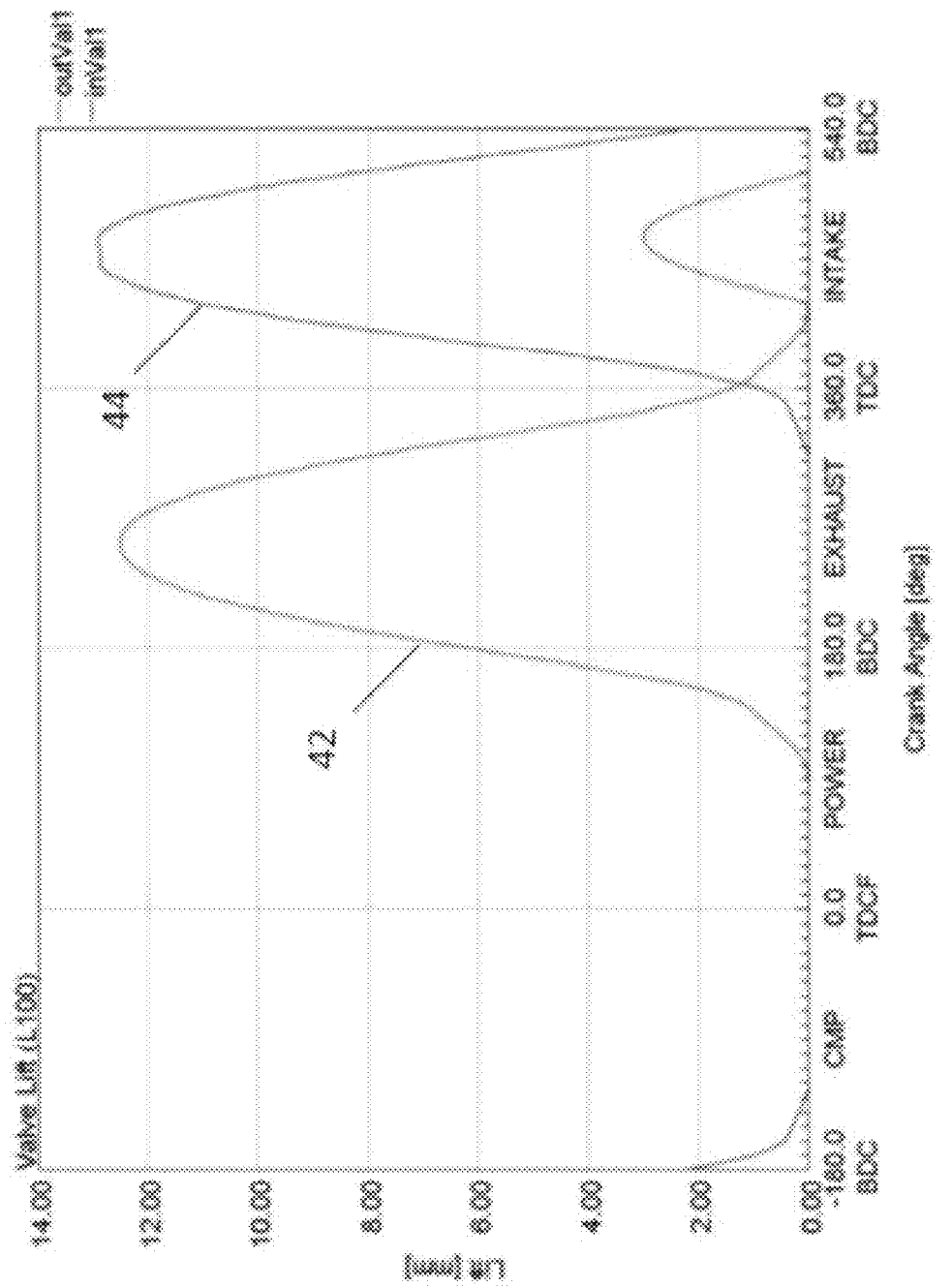
FIG. 2a to d: graphical illustrations of preferred embodiments of the valve control mechanism
Figure 2B:
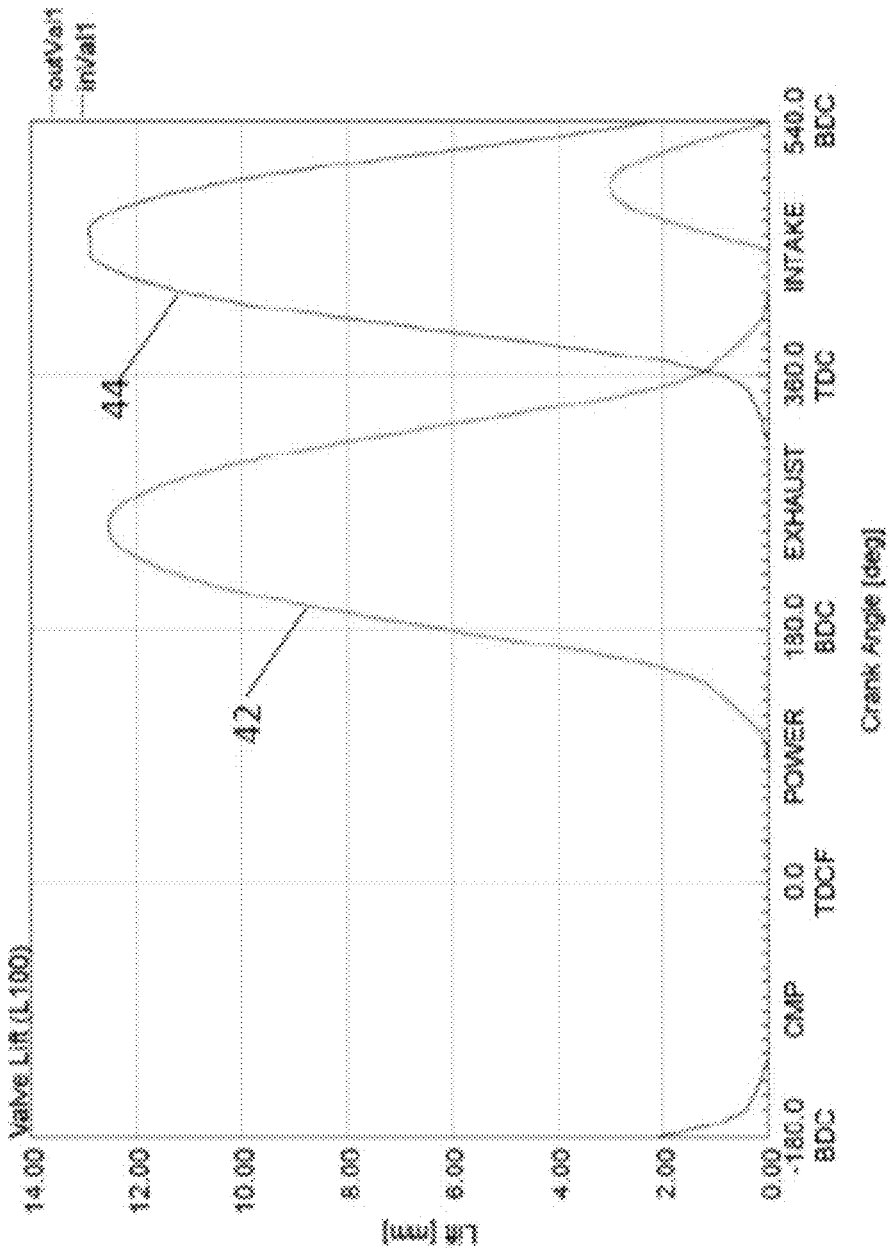
Figure 2C:
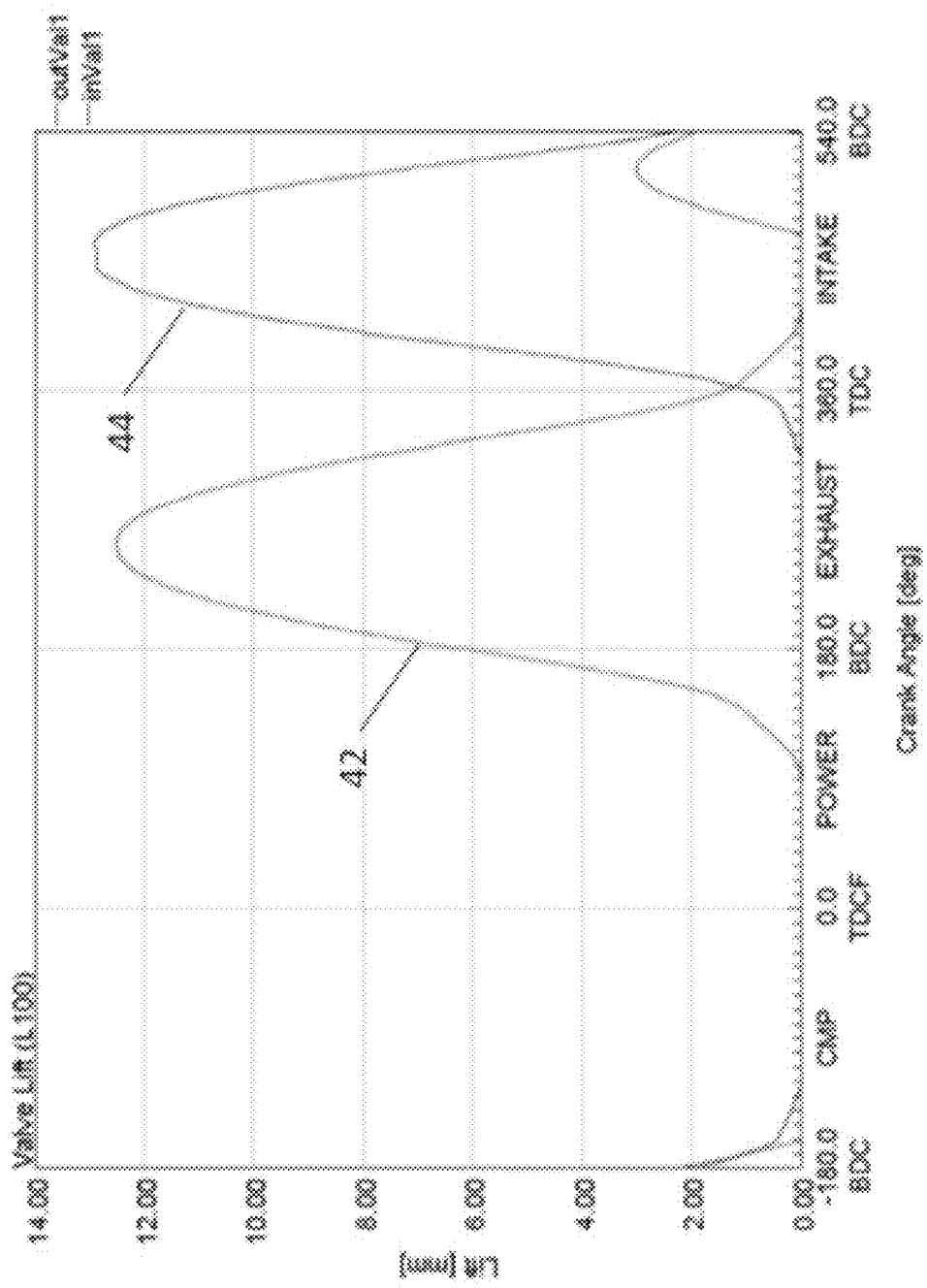
Figure 2D:
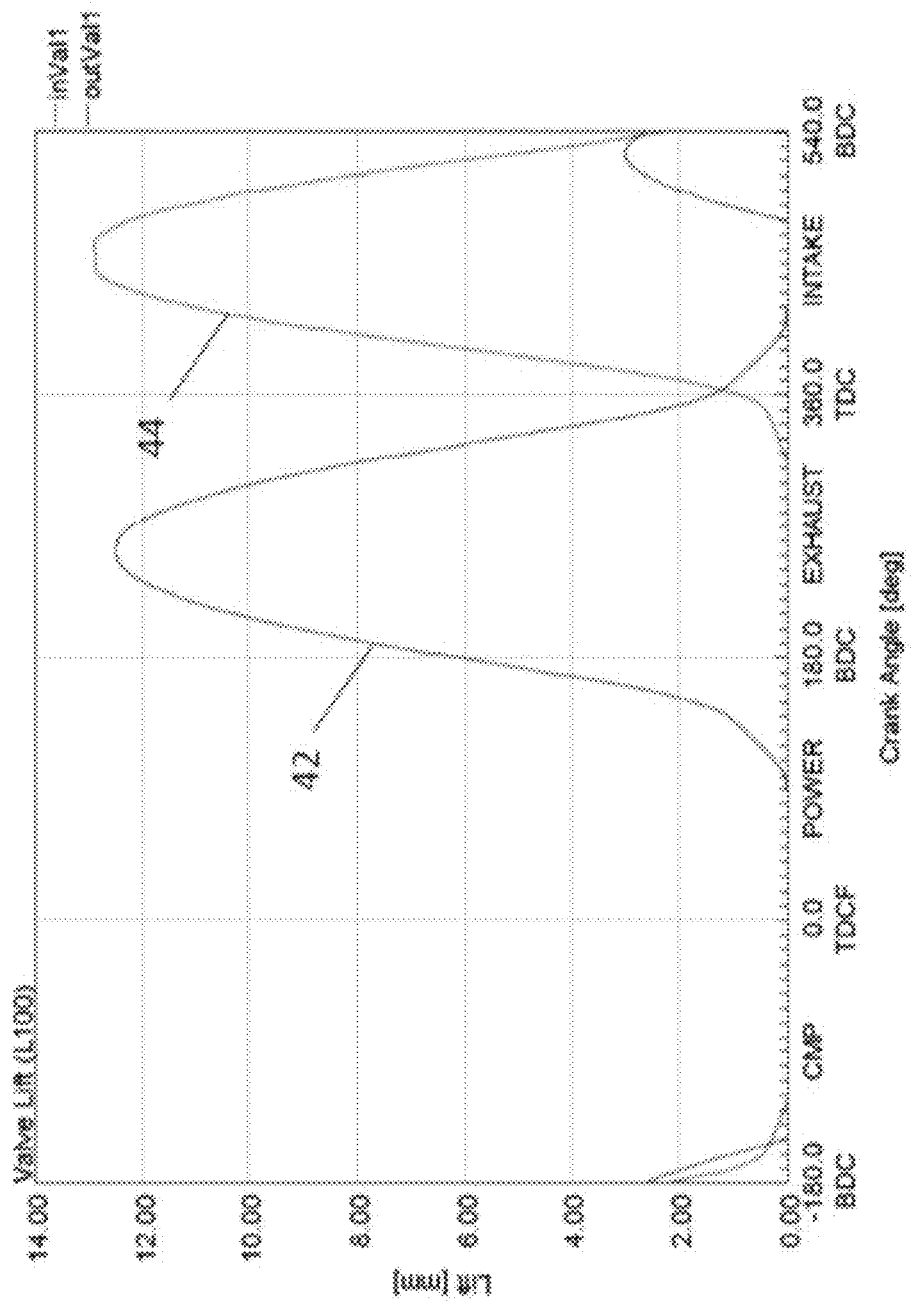

FIG. 2 shows different graphs of valve lift on the x axis and crank angel at the y-axis for "bump0" (FIG. 2a), "bump1" (FIG. 2b), "bump2" (FIG. 2c) and "bump3" (FIG. 2d). As can be seen in FIG. 2a "bump" has the exhaust valve reopening in the middle of the inlet valve opening and for "bump1" (FIG. 2b) it takes one step to the right and so on until "ibump3" (FIG. 2d). The graph 42 represents the exhaust valve lift and the graph 44 the inlet valve lift.

The results for the exhaust gas rebreathing concerning the exhaust gas temperatures are summarized in the following table 3 and are graphically illustrated in FIG. 3:

TABLE 2

| | Original valve lift | Bump | Bump1 | Bump2 | Bump3 |
|---|---|---|---|---|---|
| Temp@exhaust[K] | 430.0 | 393.0 | 407.0 | 427.0 | 466.0 |
| Shaft Power[kW] | 3.23 | −1.96 | −0.75 | 0.5 | 1.86 |
| Temp@ignition/max[K] | 913/ | 938/ | 970/ | 1045/ | 1077/ |
| | 1142 | 936 | 1011 | 1306 | 1287 |
| Temp@group1/ | 515/ | 370/ | 391/ | 464/ | 592/ |
| group2[K] | 358 | 440 | 435 | 380 | 364 |
| Massflow in[g/s] | 50.7 | 2.5 | 3.5 | 8.1 | 13.0 |

Figure 3:
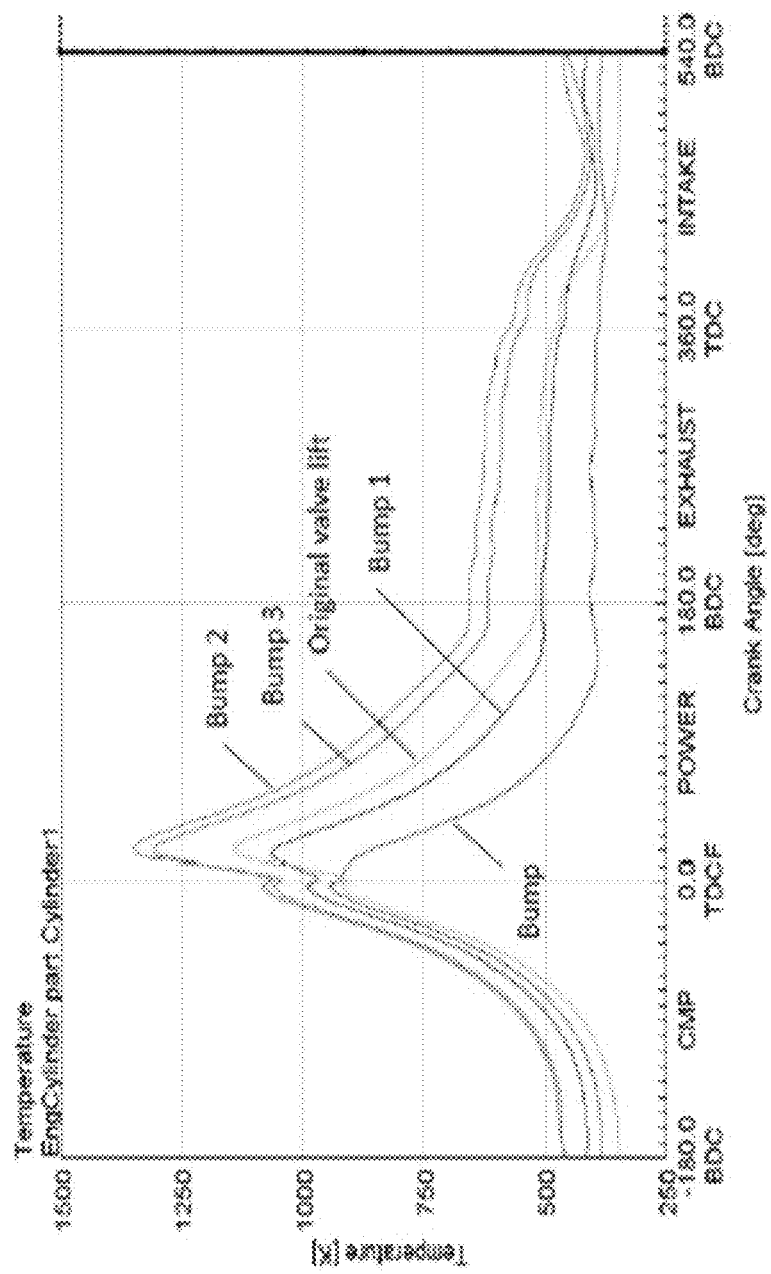
FIG. 3: a temperature diagram for valve mechanisms of FIG. 2.

FIG. 3 shows a diagram with the crank angle degree on the x axis and the temperature on the y-axis.

Figure 4A:
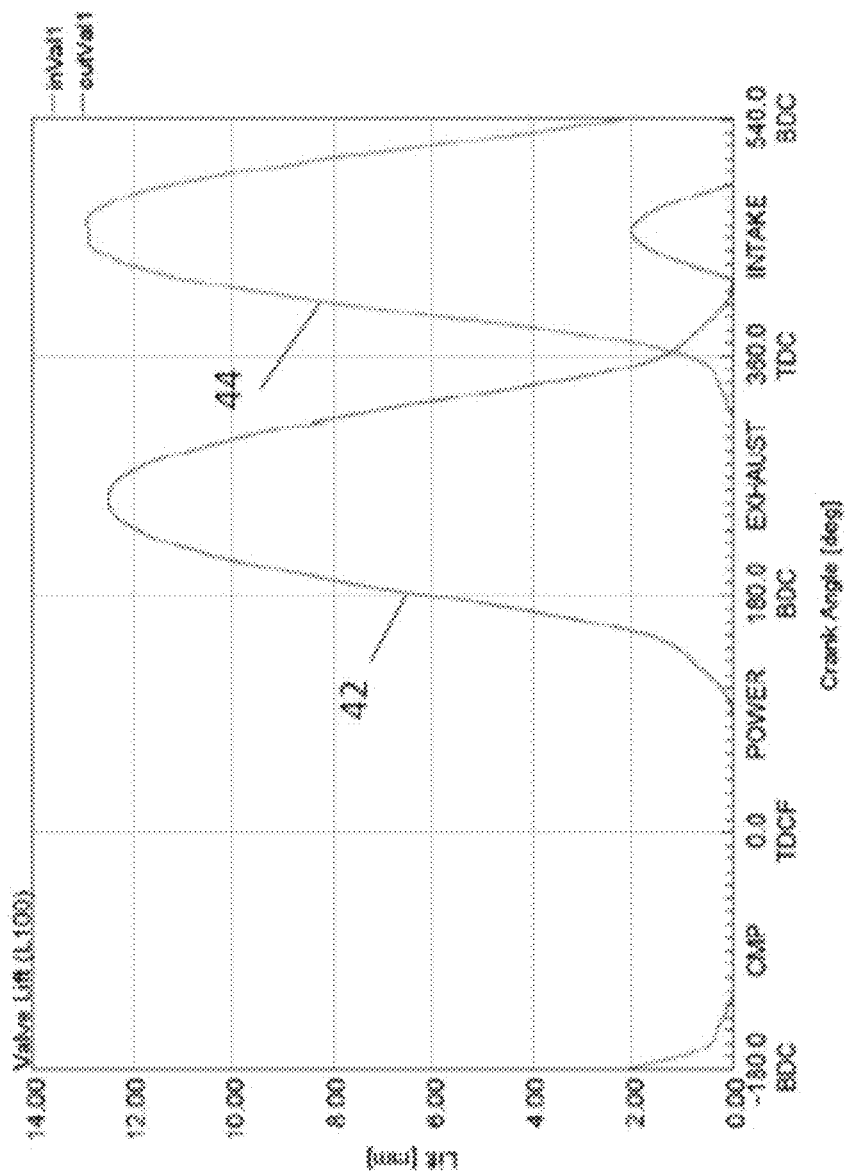
FIG. 4a, b: graphical illustrations of preferred embodiments of the valve control mechanism.
Figure 4B:
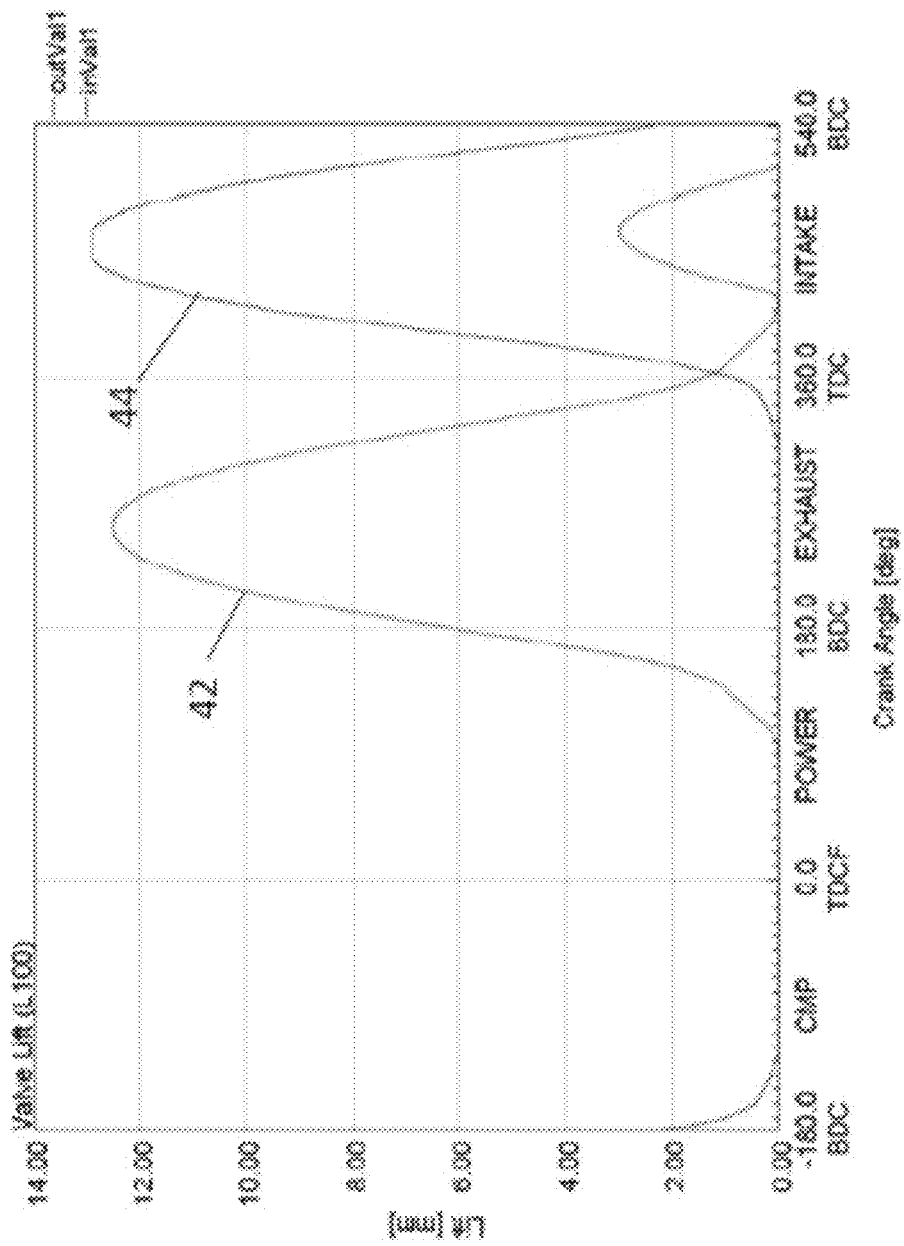

The results could be further improved by using a smaller lift on the three active cylinders 4b. The lift profile on the three passive cylinders was the same as above described and is illustrated in FIG. 4, where FIG. 4a, the diagram on the left, illustrates the smaller bump and FIG. 4b the diagram on the right the bump used before. The results for the waste gate exhaust gas pipe are listed in the table 3 below:

TABLE 3

| | |
|---|---|
| Temp@exhaust[K] | 460 |
| Bmep [g/kW-h] | 0.465939 |
| Shaft Power[kW] | 2.97673 |
| Cyltemp@ignition/max[K] | 1034/1300 |
| Temp@group1/group2[K] | 570/400 |
| Massflow in[g/s] | 12.4 |
| Massflow group1/2[g/s] | 11.3/1.5 |
| lambda | 2.79942 |

Using a smaller bump further increased the exhaust gas temperature compared to a larger bump since the large bump slowed down the flow through the system too much.

Exhaust rebreathing is not the only method for minimizing the flow of cold air through the passive cylinders. In addition a throttle on the inlet pipes to the passive cylinders 4a may be used. The throttle may have a high impact on the mass flow, presumably, it could change from 5 g/s to 1 g/s with a low pressure drop of only 1 kPa. With idle load on the engine the size of the bump was also of importance. Changing the valve lift with only 1 mm on the active cylinders 4b had a big impact on the results as seen in the tables above.

3. Combining Waste Gate Exhaust Gas Pipe and Exhaust Rebreathing:

When combing the above described methods care should be taken since the waste gate exhaust gas pipe 30 allows the bump to pump the exhaust gases backwards through the system 100. This may be avoided by using exhaust rebreathing on the inactive cylinders 4a without injection and ordinary valve lift on the active cylinders 4b with injection. This minimizes the flow of cold air through the cylinders 4a in the passive cylinder group 2a but let the active cylinders 4b pump the flow in the right direction.

Provided the waste gate exhaust gas pipe 30 had a mass flow of 13% and the active cylinders 4b got an injection of 30 mg/cycles this resulted in an inlet temperature in the waste gate exhaust gas pipe of 240° C. which could be enough for the small DOC to ignite the fuel injected by the fuel injector 34. If not, a higher temperature can easily be achieved by injecting more fuel into the active cylinders 4b. Together with an injection of 20 mg/cycle from the fuel injector 34 a temperature of 300° C. in the main exhaust gas pipe 20 were obtained. This is due to the exhaust rebreathing mechanism stopping the flow of cold air through the passive cylinders 4b. The results are summarized in the following table 4:

TABLE 4

| | |
|---|---|
| Temp@exhaust[K] | 570 |
| Inlet Temp@WG-pipe[K] | 510 |
| Shaft Power[kW] | 3.7666 |
| Temp@ignition/max[K] | 906/1146 |
| Temp@group1/group2[K] | 518/400 |
| Massflow in[g/s] | 39.3 |
| Massflow group1/2[g/s] | 23.6/2.18 |

As can be seen in the table 4 the exhaust rebreathing mechanism lowers the mass flow through a cylinder significantly; to the regarded case the mass flow through the passive cylinders 4a is ten times lower than the mass flow through the active cylinders 4b.

Exhaust rebreathing was only performed on the three inactive cylinders 4a without injection. This lowered the flow through inactive cylinder group 2a and thereby prevented the warm exhaust gas from the active cylinder group 2b from cooling down. The resulting temperature in the main exhaust pipe 20 may be further adjusted by adjusting the amount of fuel injected by the fuel injector 34.

When closing the waste gate exhaust gas pipe 30 in order to study the impact of the exhaust rebreathing mechanism alone the following results were obtained:

TABLE 5

| | |
|---|---|
| Temp@exhaust[K] | 450.0 |
| Shaft Power[kW] | 3.73241 |
| Temp@ignition/max[K] | 908/1145 |

TABLE 5-continued

| Temp@group1/group2[K] | 517/391 |
|---|---|
| Massflow in[g/s] | 30.9 |
| Massflow group1/2[g/s] | 27.7/3..67 |

In this case there is a higher mass flow through the active and the inactive cylinder group 4a, 4b although the total mass flow is lower. This is due to the closed waste gate exhaust gas pipe 30. As can be seen even the rebreathing mechanism alone increased the exhaust temperature significantly.

Figure 5:
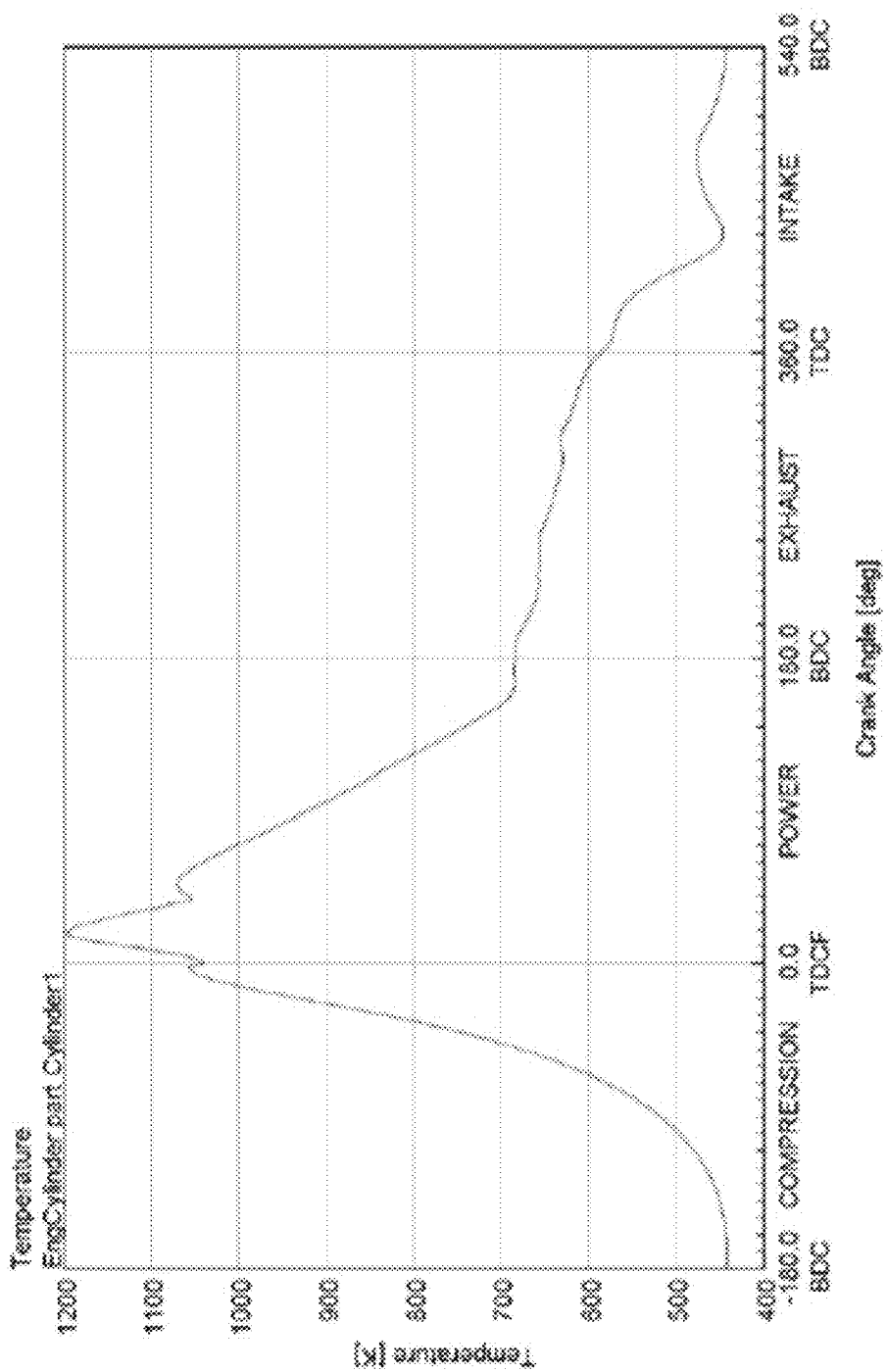
FIG. 5: a temperature diagram for a further preferred valve mechanism.

4. Late Post Injection:

The above described late post injection resulted in roughly additional 250° C. in the exhaust gases compared to the exhaust rebreathing mechanism without late post injection. FIG. 5 shows the corresponding temperature curve for an active cylinder 4b, with the crank angle degree on the x-axis and the temperature on the y-axis. The results are summarized in the following table 6:

TABLE 6

| Temp@exhaust[K] | 465.0 |
|---|---|
| Shaft Power[kW] | 2.11612 |
| Temp@ignition/max[K] | 1052/1195 |
| Temp@group1/group2[K] | 620/415 |
| Massflow in[g/s] | 11.9 |
| Massflow group1/2[g/s] | 11.2/1.12 |
| lambda | 2.8038 |

As can be seen, 0.8 kW is lost in shaft power so once again some power is lost for increasing the temperature in the exhaust. The 485 K in the table above is the total temperature in the main exhaust gas pipe while the temperature out of the active cylinders is 620 K. Combining this with the waste gate exhaust gas pipe method a temperature above 530 K, which is the temperature needed to ignite the fuel from the fuel injector 34, may be achieved.

As mentioned above, the above described methods may also be used for engines with partial premixed combustion (PPC) PPC combustion has been shown to work well at medium to high loads. Since PPC can simplified be described as running a diesel engine on bad gasoline, it is not surprising that there is at cold start, idle and low load a problem with excessive HC and CO engine out emissions.

The above discussed exhaust rebreathing mechanism has been shown to improve this situation. This will increase in cylinder temperature and reduce CO and HC emissions. It is further known that HC and CO emission are not a problem if the exhaust gas aftertreatment system is active. But the conversion efficiency drops to unacceptable levels when the catalyst temperature drops below 250° C. Consequently, the exhaust gas aftertreatment system should be maintained at its temperatures above 250° C. also during low load engine operation situations.

Inventively at low load the cylinders of the PPC engine are controlled to be split into a first inactive cylinder group 2a and a second active cylinder group 2b. Additionally or alternatively, also the intake manifold 8 is split in two parts 8a and 8b in order to be able to have a separate throttle for each cylinder group 2a, 2b. For reducing the air flow through the inactive cylinders 4a as much as possible without overheating the nozzles or overthrottling, the PPC engine is then operated comprising at least one of the following steps:

Activate exhaust rebreathing on all cylinders;
Throttle the active cylinders 4b slightly in order to increase combustion temperature;
Throttle the inactive cylinders 4a more than the active cylinders 4b for reducing the pumping of cold air through the inactive cylinders.

This strategy results in a sufficiently increased load (on the active cylinder group) for moving out of the PPC problem zone and in an increased temperature on the active cylinder group which helps with the PPC low load problem. This strategy also helps to increase exhaust gas temperature in order to make the catalyst active for CO and HC oxidation due to the increased exhaust gas temperature from the active cylinder group 4b and/or air heating in the inactive cylinder group 4a.

As earlier mentioned, the exhaust pulse diminishes rapidly with lower loads. By increasing the load on one cylinder group it is possible to gain better pulses in the flow stream through the turbine. This increases the turbocharger heat recovery in the low load range of roughly 10-25%. Above roughly 25% load it is not likely that a divided cylinder group approach is applicable since that corresponds to 50% load on the active cylinders.

In summary, the different aspects of the inventive method and/or the inventive internal combustion engine system allow for a higher exhaust gas temperature during temperature critical engine operation situations such as PPC, cold start, low load, idle and/or motoring engine operation modes. Since either the temperature in the cylinders themselves or the temperature of the exhaust gas or both is significantly increased during the temperature critical engine operation situations, the exhaust gas aftertreatment system may be brought to its working temperature rapidly and may be maintained at its working temperature for a long period of time.

REFERENCE NUMERALS 100 internal combustion engine system
1 internal combustion engine
2 cylinder block
2a inactive cylinder group
2b active cylinder group
4 cylinder
4a inactive cylinder
4b active cylinder
6 gas intake side
8 intake manifold
8a inactive intake manifold part
8b active intake manifold part
10 exhaust gas side
12 exhaust gas manifold
12a inactive exhaust gas manifold part
12b active exhaust gas manifold part
14 turbocharger
16 first turbine
18 second turbine
20 first/main exhaust gas pipe
22 exhaust gas aftertreatment system
24 main diesel oxidation catalyst
26 main particle filter
28 selective reduction reactor
30 waste gate exhaust gas pipe
32 valve
34 fuel injector
36 small diesel oxidation catalyst
40 EGR pipe
42 exhaust valve lilt
44 intake valve lift

The invention claimed is:

1. An internal combustion engine system comprising a cylinder block with a plurality of cylinders, a gas intake manifold for providing at least air to the cylinder block and an exhaust gas manifold for exiting the exhaust gas from the cylinder block; wherein the exhaust gas manifold comprises at least a main exhaust gas outlet and a waste gate exhaust gas outlet, wherein the main exhaust gas outlet is connected to a main exhaust gas pipe for guiding the exhaust gas to a main exhaust gas aftertreatment system, and the waste gate exhaust gas outlet is connected to a waste gate exhaust gas pipe, the waste gate exhaust gas pipe is reconnected to the main exhaust gas pipe upstream of the main exhaust gas aftertreatment system and comprises at least a waste gate oxidation catalyst for catalytically treating the exhaust gas streaming through the waste gate exhaust gas pipe, wherein, the main exhaust gas aftertreatment system comprises at least one main oxidation catalyst, and wherein the waste gate oxidation catalyst and the main oxidation catalyst are configured as an integrated device, wherein the plurality of cylinders of the cylinder block are arranged in at least a first cylinder group and a second cylinder group, wherein cylinders of the first cylinder group are different cylinders than cylinders of the second cylinder group, wherein the exhaust gas manifold is configured to provide a first exhaust gas manifold part which is assigned to the first cylinder group and the main exhaust gas outlet, and a second exhaust gas manifold part which is assigned to the second cylinder group and the waste gate exhaust gas outlet.

2. The internal combustion engine system according to claim 1, wherein a waste gate valve is arranged at a waste gate exhaust gas outlet in the waste gate exhaust gas pipe for controlling an amount of exhaust gas streaming through the waste gate exhaust gas pipe.

3. The internal combustion engine system according to claim 1, wherein a fuel injector for injecting fuel into the exhaust gas streaming through the waste gate exhaust gas pipe is arranged upstream of the at least one exhaust gas aftertreatment unit.

4. The internal combustion engine system according to claim 3, wherein the fuel injector and/or the at least one waste gate exhaust gas aftertreatment unit is arranged sufficiently close to the exhaust gas manifold so that the exhaust gas comprises a pulsation triggered by movement of the cylinders for mixing injected fuel with exhaust gas.

5. The internal combustion engine according to claim 1, wherein the main oxidation catalyst comprises a first entry which is connected to the waste gate exhaust gas pipe and a second entry which is connected to the main exhaust gas pipe.

6. The internal combustion engine system according to claim 5, wherein the plurality of cylinders of the cylinder block are arranged in at least a first cylinder group and a second cylinder group, each cylinder group comprises an intake throttle, each intake throttle being separably operable, wherein the intake manifold comprises a first intake manifold part which is assigned to the first cylinder group and a second intake manifold part which is assigned to the second cylinder group.

7. The internal combustion engine system according to claim 1, wherein at least one turbocharger unit is arranged in the main exhaust gas pipe, and wherein the waste gate exhaust gas pipe is connected to the main exhaust gas pipe downstream of the at least one turbocharger unit.

8. The internal combustion engine system according to claim 1, wherein the exhaust gas manifold provides a first exhaust gas flow from the first cylinder group, and a second exhaust gas flow from the second cylinder group.

9. The internal combustion engine system according to claim 8, wherein the exhaust gas manifold provides a third exhaust gas flow from the second cylinder group through a third exhaust gas pipe, wherein the third exhaust gas pipe is adapted to provide exhaust gas to at least one turbocharger unit.

10. The internal combustion engine system according to claim 9, wherein the main exhaust gas pipe and the third exhaust gas pipe are adapted to provide exhaust gas to the same turbocharger unit, wherein the turbocharger unit comprises a dual entry turbine.

11. The internal combustion engine system according to claim 1, wherein the second exhaust gas manifold part further comprises a third exhaust gas outlet which is connected to a third exhaust gas pipe.

12. The internal combustion engine system according to claim 1, wherein the internal combustion engine system further comprises an exhaust gas recirculation (EGR) pipe for recirculating at least part of the exhaust gas to the gas intake side of the internal combustion engine.

13. The internal combustion engine system according to claim 12, wherein the exhaust gas recirculation pipe is branched off directly from the exhaust gas manifold upstream of at least one unit of the main exhaust gas aftertreatment system.

14. The internal combustion engine system according to claim 1, wherein the internal combustion engine is operated by a fuel having a cetane number below 38.

15. A vehicle comprising an internal combustion engine system according to claim 1.

16. An internal combustion engine system comprising a cylinder block with a plurality of cylinders, a gas intake manifold for providing at least air to the cylinder block and an exhaust gas manifold for exiting the exhaust gas from the cylinder block; wherein the exhaust gas manifold comprises at least a main exhaust gas outlet and a waste gate exhaust gas outlet, wherein the main exhaust gas outlet is connected to a main exhaust gas pipe for guiding the exhaust gas to a main exhaust gas aftertreatment system, and the waste gate exhaust gas outlet is connected to a waste gate exhaust gas pipe, the waste gate exhaust gas pipe is reconnected to the main exhaust gas pipe upstream of the main exhaust gas aftertreatment system and comprises a waste gate oxidation catalyst for catalytically treating the exhaust gas streaming through the waste gate exhaust gas pipe, wherein at least one turbocharger unit is arranged in the main exhaust gas pipe, and wherein the waste gate exhaust gas pipe is connected to the main exhaust gas pipe downstream of the at least one turbocharger unit, wherein the exhaust gas manifold is configured to provide a first exhaust gas manifold part which is assigned to a first cylinder group and the main exhaust gas outlet, and a second exhaust gas manifold part which is assigned to a second cylinder group and the waste gate exhaust gas outlet, wherein the second exhaust gas manifold part further comprises a third exhaust gas outlet which is connected to a third exhaust gas pipe, and wherein the third exhaust gas pipe is branched off from the first exhaust gas manifold part which is assigned to the first cylinder group and recirculates exhaust gas to the intake manifold.

17. A method for increasing the temperature in an internal combustion engine system during a temperature critical operation situation, the temperature critical operation situation including one or more of running the internal combustion engine with fuel having a cetane number below 38, and/or a cold start situation and/or a low load engine operation mode and/or an idle engine operation mode and/or a motoring engine operation mode, wherein the internal combustion engine comprises a cylinder block with a plurality of cylinders, a gas intake manifold for providing at least air to the cylinder block and an exhaust gas manifold for exiting the exhaust gas from the cylinder block, wherein the exhaust gas manifold comprises at least a main exhaust gas outlet and a waste gate exhaust gas outlet, wherein the main exhaust gas outlet is connected to a main exhaust gas pipe for guiding the exhaust gas to a main exhaust gas aftertreatment system and the waste gate exhaust gas outlet is connected to a waste gate exhaust gas pipe, wherein the waste gate exhaust gas pipe is reconnected to the main exhaust gas pipe upstream of the main exhaust gas aftertreatment system and comprises at least one waste gate oxidation catalyst for catalytically treating the exhaust gas streaming through the waste gate exhaust gas pipe, wherein, the main exhaust gas aftertreatment system comprises at least one main oxidation catalyst, and wherein the waste gate oxidation catalyst and the main oxidation catalyst are configured as an integrated device, wherein the plurality of cylinders of the cylinder block are arranged in at least a first cylinder group and a second cylinder group wherein cylinders of the first cylinder group are different cylinders than cylinders of the second cylinder group, wherein the exhaust gas manifold is configured to provide a first exhaust gas manifold part which is assigned to the first cylinder group and the main exhaust gas outlet, and a second exhaust gas manifold part which is assigned to the second cylinder group and the waste gate exhaust gas outlet, the method comprising the steps of:

determining whether the internal combustion engine system is operated in the temperature critical situation; and
 in case the internal combustion engine system is operated in the temperature critical situation opening the waste gate exhaust gas pipe and operating the at least one waste gate oxidation catalyst.

18. The method according to claim 17, wherein the main exhaust gas outlet is assigned to the first cylinder group, and the waste gate exhaust gas outlet a third exhaust gas outlet are assigned to the second cylinder group.

19. The method according to claim 17, wherein a fuel injector is arranged in the waste gate exhaust gas pipe for injecting fuel into the exhaust gas streaming through the waste gate exhaust gas pipe during the temperature critical situation, wherein the fuel injector is arranged upstream of the at least one waste gate oxidation catalyst.

\* \* \* \* \*